United States Patent
Nichols et al.

(10) Patent No.: US 7,982,604 B2
(45) Date of Patent: Jul. 19, 2011

(54) TAMPER-INDICATING MONETARY PACKAGE

(75) Inventors: Michelle Nichols, Rock Hill, SC (US);
Todd Atwood, Charlotte, NC (US);
James Heddleson, Charlotte, NC (US);
Karen Garnett, St. Louis, MO (US);
Elizabeth S. Votaw, Potomac, MD (US);
Felix Mon, Jacksonville, FL (US)

(73) Assignee: Bank of America, Charlotte, NC (US)

( * ) Notice: Subject to any disclaimer, the term of this patent is extended or adjusted under 35 U.S.C. 154(b) by 246 days.

(21) Appl. No.: 12/262,532

(22) Filed: Oct. 31, 2008

(65) Prior Publication Data

US 2009/0309722 A1   Dec. 17, 2009

Related U.S. Application Data

(60) Provisional application No. 61/061,987, filed on Jun. 16, 2008.

(51) Int. Cl.
*G08B 13/00* (2006.01)
(52) U.S. Cl. .............. 340/541; 340/568.1; 340/568.7; 340/571; 340/572.1
(58) Field of Classification Search .......... 340/572.1, 340/541, 568.1, 568.7, 571, 506
See application file for complete search history.

(56) References Cited

U.S. PATENT DOCUMENTS

| | | | |
|---|---|---|---|
| 3,618,059 A | 11/1971 | Allen | |
| 4,352,097 A * | 9/1982 | Hamann | 340/568.7 |
| 5,453,601 A | 9/1995 | Rosen | |
| 5,689,240 A | 11/1997 | Traxler | |
| 5,952,920 A * | 9/1999 | Braddick | 340/568.1 |
| 5,953,423 A | 9/1999 | Rosen | |
| 5,963,131 A | 10/1999 | D'Angelo et al. | |
| 6,047,807 A | 4/2000 | Molbak | |
| 6,122,625 A | 9/2000 | Rosen | |
| 6,483,433 B2 | 11/2002 | Moskowitz et al. | |
| 6,633,881 B2 | 10/2003 | Drobish et al. | |
| 6,736,314 B2 | 5/2004 | Cooper et al. | |
| 6,788,203 B1 | 9/2004 | Roxbury et al. | |
| 6,845,905 B2 | 1/2005 | Blad et al. | |
| 7,042,360 B2 | 5/2006 | Light et al. | |
| 7,212,992 B1 | 5/2007 | Kanevsky et al. | |
| 7,348,886 B2 | 3/2008 | Himberger et al. | |
| 7,375,638 B2 | 5/2008 | Light et al. | |
| 7,474,217 B2 | 1/2009 | Himberger et al. | |

(Continued)

FOREIGN PATENT DOCUMENTS

DE   4019265   11/1991

(Continued)

OTHER PUBLICATIONS

Powerpoint Presentation, DTS Product Overview, IFS, Apr. 2006, 17 pages.

(Continued)

*Primary Examiner* — Toan N Pham
(74) *Attorney, Agent, or Firm* — Banner & Witcoff, Ltd.; Michael Springs

(57) ABSTRACT

A monetary package capable of detecting and communicating tampering is described. The monetary package may comprise a container having a volume configured to hold monetary items such as currency, checks, and negotiable instruments, a sensor configured to detect an opening of the container, a device coupled to the sensor and configured to store data responsive to the sensor detecting the opening of the container, and a transmitter configured to wirelessly send the stored data.

20 Claims, 10 Drawing Sheets

U.S. PATENT DOCUMENTS

| | | | |
|---|---|---|---|
| 7,659,816 B2 * | 2/2010 | Wandel | 340/541 |
| 7,714,708 B2 * | 5/2010 | Brackmann et al. | 340/539.1 |
| 7,719,423 B2 | 5/2010 | Himberger et al. | |
| 7,748,610 B2 | 7/2010 | Bell et al. | |
| 2001/0054643 A1 | 12/2001 | Siemens | |
| 2002/0194122 A1 | 12/2002 | Knox et al. | |
| 2003/0011466 A1 * | 1/2003 | Samuel et al. | 340/5.73 |
| 2003/0050891 A1 | 3/2003 | Cohen | |
| 2003/0061153 A1 | 3/2003 | Birdsong et al. | |
| 2003/0122671 A1 | 7/2003 | Jeserpsen | |
| 2003/0208431 A1 | 11/2003 | Raynes et al. | |
| 2003/0234719 A1 | 12/2003 | Denison et al. | |
| 2004/0056767 A1 | 3/2004 | Porter | |
| 2004/0083149 A1 | 4/2004 | Jones | |
| 2004/0100379 A1 | 5/2004 | Boman et al. | |
| 2005/0091129 A1 | 4/2005 | Tien | |
| 2005/0108164 A1 | 5/2005 | Solafia, III et al. | |
| 2005/0183928 A1 | 8/2005 | Jones et al. | |
| 2005/0273347 A1 | 12/2005 | Dudley et al. | |
| 2006/0282277 A1 | 12/2006 | Ng | |
| 2007/0005452 A1 | 1/2007 | Klingenberg et al. | |
| 2007/0008118 A1 | 1/2007 | Kassiedass | |
| 2007/0012602 A1 | 1/2007 | Baldassari et al. | |
| 2007/0034693 A1 | 2/2007 | Jouvin et al. | |
| 2007/0063016 A1 | 3/2007 | Myatt et al. | |
| 2007/0226142 A1 | 9/2007 | Hanna et al. | |
| 2007/0282724 A1 | 12/2007 | Barnes et al. | |
| 2008/0005019 A1 | 1/2008 | Hansen | |
| 2008/0103959 A1 | 5/2008 | Carroll et al. | |
| 2008/0149706 A1 | 6/2008 | Brown et al. | |
| 2008/0199155 A1 | 8/2008 | Hagens et al. | |
| 2008/0223930 A1 | 9/2008 | Rolland et al. | |
| 2008/0262949 A1 | 10/2008 | Bond et al. | |
| 2008/0265019 A1 | 10/2008 | Artino et al. | |
| 2008/0303903 A1 | 12/2008 | Bentley et al. | |
| 2009/0006249 A1 | 1/2009 | Morgan et al. | |
| 2009/0006250 A1 | 1/2009 | Bixler et al. | |
| 2009/0032580 A1 | 2/2009 | Blachowicz et al. | |
| 2009/0051566 A1 | 2/2009 | Olsen et al. | |
| 2009/0051769 A1 | 2/2009 | Kuo et al. | |
| 2009/0164364 A1 | 6/2009 | Galit et al. | |
| 2009/0187482 A1 | 7/2009 | Blount et al. | |

FOREIGN PATENT DOCUMENTS

| | | |
|---|---|---|
| DE | 4429815 | 2/1996 |
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| WO | 9933040 | 7/1999 |
| WO | 03034359 | 4/2003 |
| WO | 2005041385 | 5/2005 |
| WO | 2005106722 | 11/2005 |

OTHER PUBLICATIONS

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.

Powerpoint Presentation, Guck, "PakTrak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

Office Action from related U.S. Appl. No. 12/262,534 dated Jun. 24, 2010.

Office Action from related U.S. Appl. No. 12/263,041 dated Mar. 12, 2010.

Office Action from related U.S. Appl. No. 12/262,908 dated Mar. 8, 2010.

International Search Report and Written Opinion for PCT/US2009/047452, mailed Aug. 25, 2009.

European Search Report in EP09007879 dated Oct. 1, 2009.

European Search Report in EP09007878 dated Oct. 1, 2009.

Non-Final Office Action for U.S. Appl. No. 12/262,448 dated Sep. 15, 2010.

Non-Final Office Action for U.S. Appl. No. 12/262,526 dated Sep. 16, 2010.

Non-Final Office Action for U.S. Appl. No. 12/262,472, dated Oct. 18, 2010.

Final Office in U.S. Appl. No. 12/263,041 dated Jan. 26, 2011.

Final Office in U.S. Appl. No. 12/262,448 dated Feb. 1, 2011.

Final Office in U.S. Appl. No. 12/262,522 dated Feb. 3, 2011.

Final Office in U.S. Appl. No. 12/262,432 dated Dec. 7, 2010.

Non-Final Office Action in U.S. Appl. No. 12/262,523 dated Nov. 9, 2010.

Final Office Action in U.S. Appl. No. 12/262,526 dated Nov. 23, 2010.

Non-Final Office Action in U.S. Appl. No. 12/262,928 dated Nov. 10, 2010.

Non-Final Office Action in U.S. Appl. No. 12/263,115 dated Nov. 16, 2010.

Notice of Allowance in U.S. Appl. No. 12/262,502 dated Oct. 19, 2010.

* cited by examiner

TAMPER-INDICATING MONETARY PACKAGE

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client's site where the deposit was prepared to the bank or bank's representative who will continue the processing of the deposit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients.

In addition, because cash must be physically transferred along the cash supply chain, there is a risk that the cash may be stolen or otherwise inappropriately handled prior to arriving at its destination.

SUMMARY

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential theft, fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed cash package) may be recognized much earlier, even prior to actual deposit or arrival of the package at the processing site.

Because monetary packages may now be traceable and accounted for at checkpoints while en route through the cash supply chain, it may further be desirable to add a tamper detection function to monetary packages that allows one to determine at any checkpoint whether the monetary package has been inappropriately tampered with.

Accordingly, still further aspects are directed to providing monetary packages with a tamper detection capability that can determine whether the monetary package may have been handled in such a way that its contents may have been modified. In particular, it may be detected whether the monetary package has been opened in an unauthorized manner, and information about such unauthorized opening may be stored as data in a memory attached to the monetary package. The next time that the monetary package is examined (e.g., scanned by a device capable of reading the stored data), the unauthorized opening may be determined and appropriate actions taken. In contrast, conventionally one will often not know whether the monetary package has been opened until it has reached its destination and the cash contents have been counted. Therefore, such a feature may allow the tampering to be detected much earlier in the cash supply chain and may also allow one to narrow down where in the cash supply chain the tampering occurred. In today's environment, one may never know if some of the notes are removed. A bank would typically take this as a loss or the client would take the difference as a loss.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
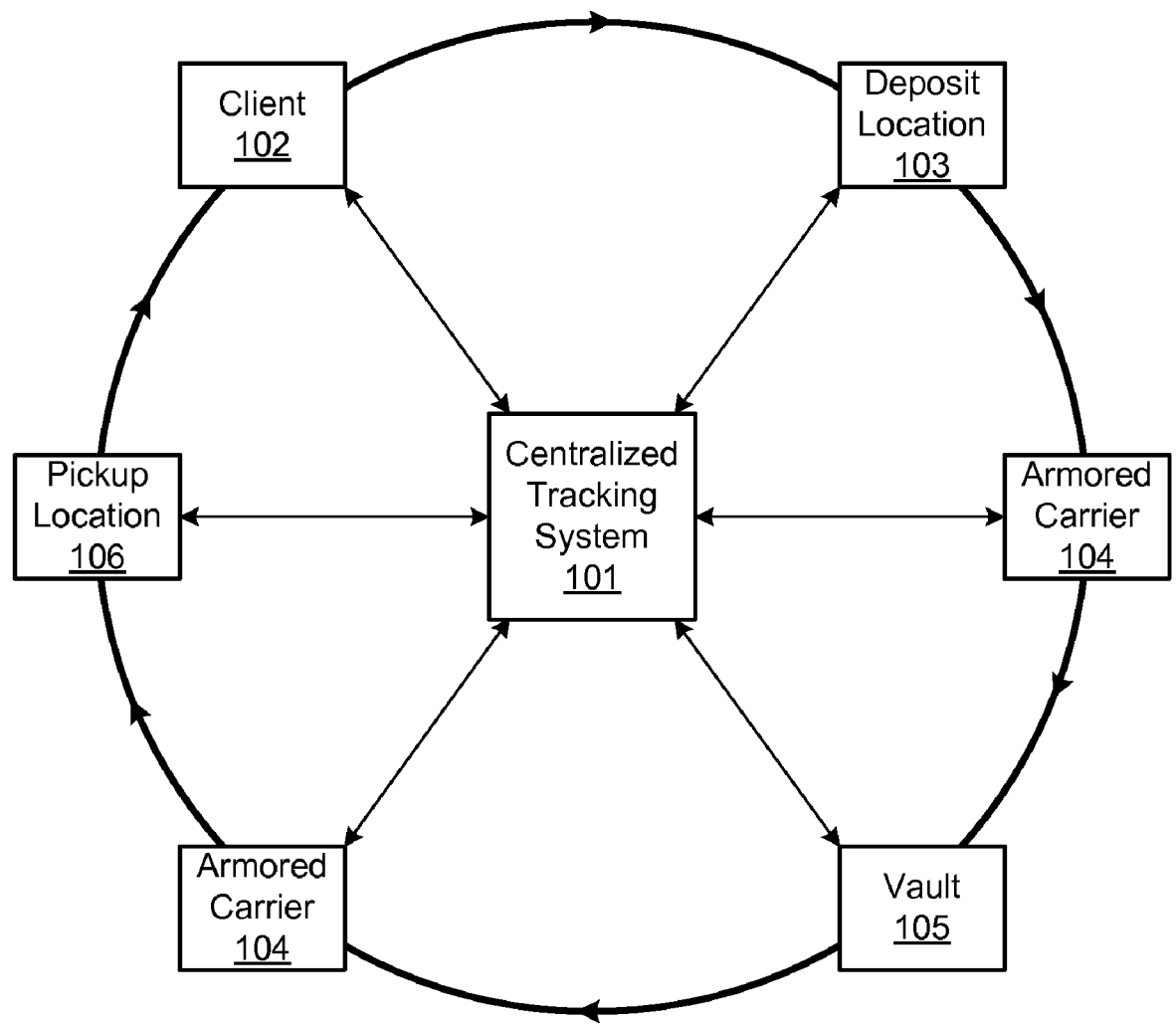
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at a phone or terminal through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104 (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
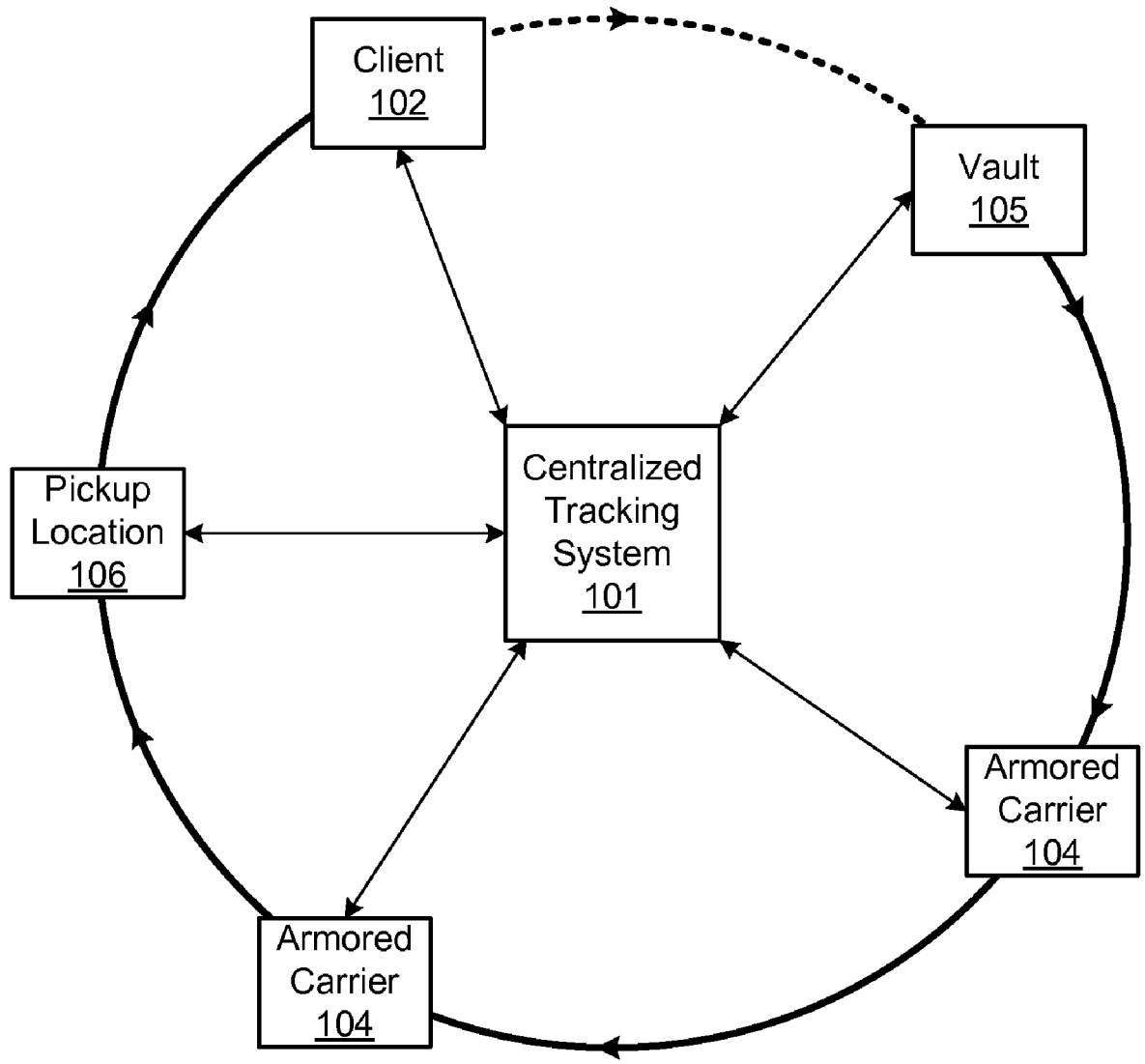
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
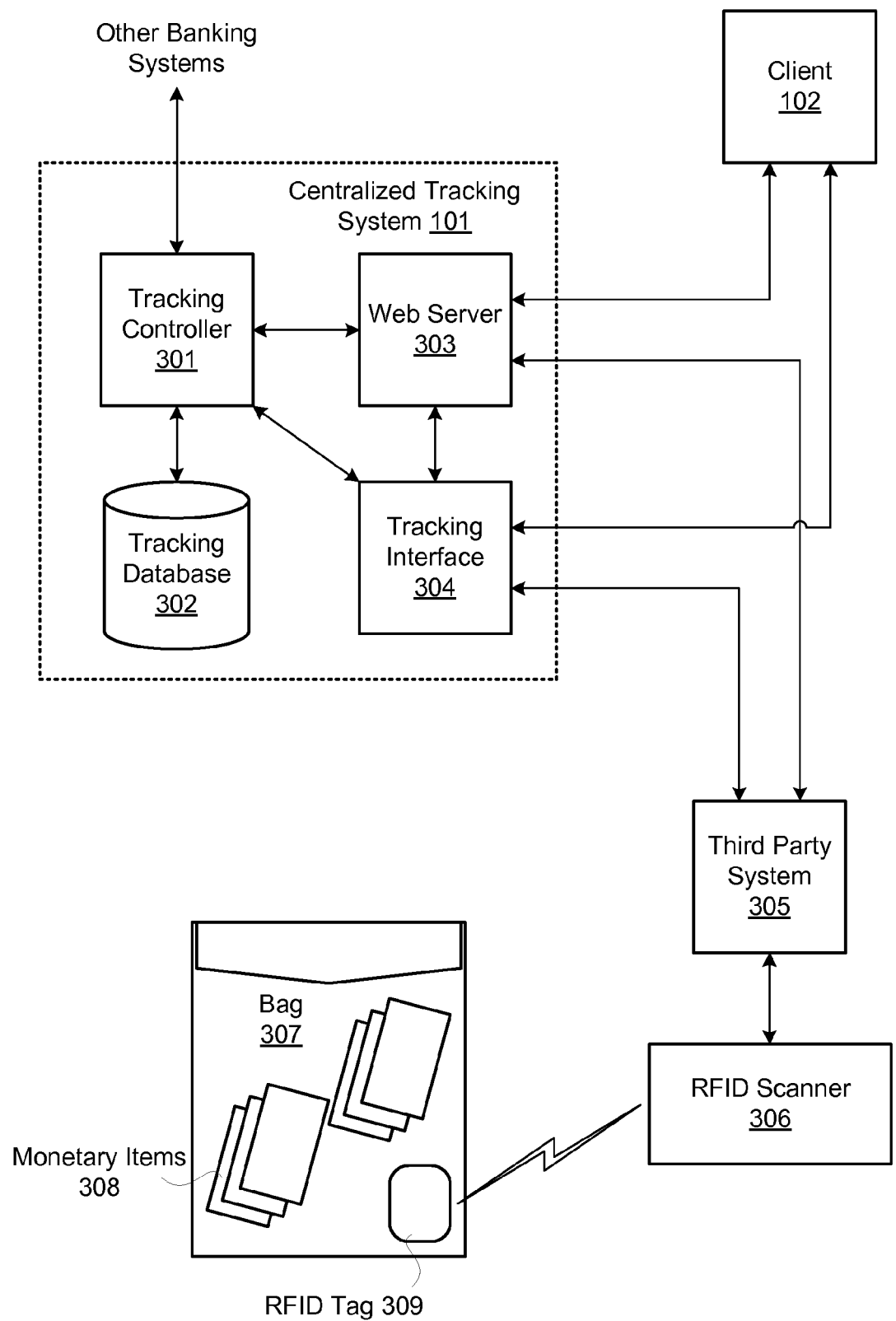
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
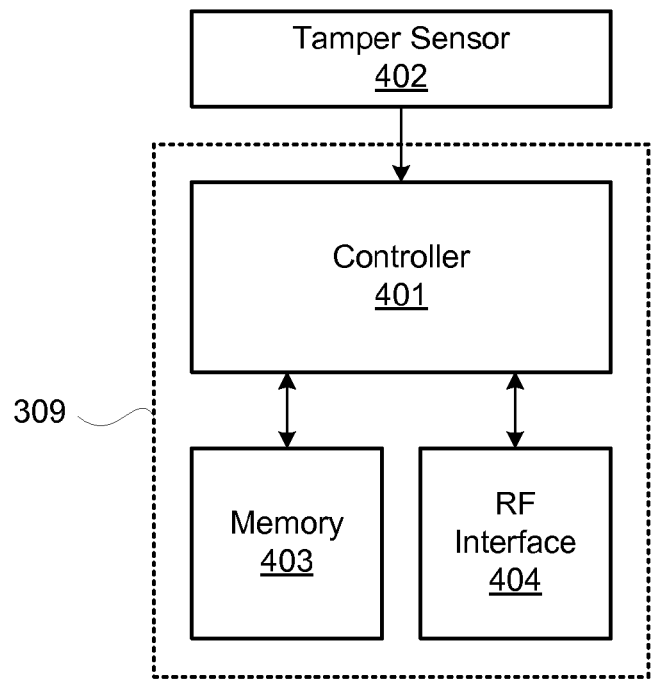
FIG. 4 is a functional block diagram of an illustrative monetary package tamper-indicating device.
Figure 5:
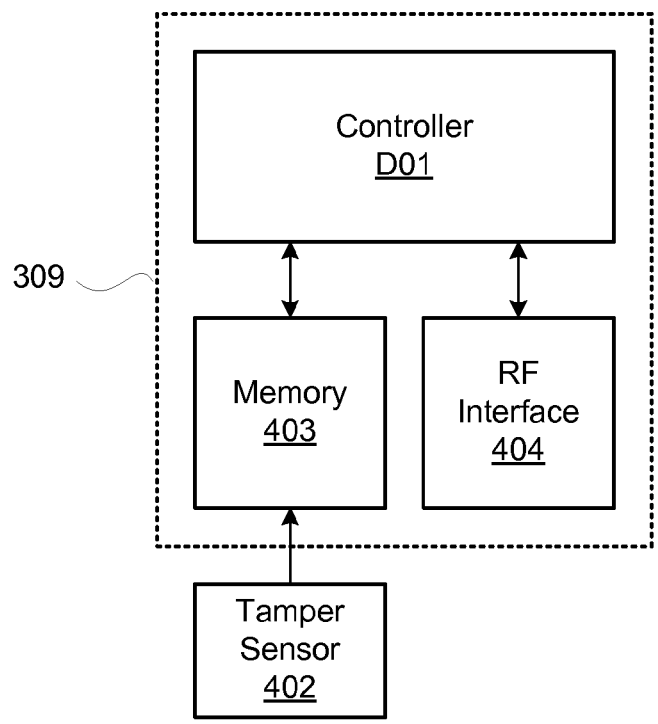
FIG. 5 is a functional block diagram of another illustrative monetary package tamper-indicating device.

FIGS. 4 and 5 show alternative illustrative functional block diagrams of RFID tag 309, along with a tamper sensor 402 coupled thereto. In both embodiments, RFID tag 309 is shown to include a controller 401, a memory 403, and a radio-frequency (RF) interface 404. RF interface 404 may include a wireless RF transmitter and a wireless RF receiver, as is commonly known in the art. In the embodiment of FIG. 4, tamper sensor 402 is illustratively shown to be connected to (or part of) controller 401, and in the embodiment of FIG. 5, tamper sensor 402 is illustrative shown to be connected to (or part of) memory 403.

It should be noted that the divisions between functional blocks in FIGS. 4 and 5 are merely illustrative, and that the physical division of the functional blocks 401-404 may be different from the functional division. Moreover, some or all of the functional blocks may be combined or further subdivided functionally and/or physically.

Controller 401 is configured to control the operations of RFID tag 309, such as storage and retrieval of data in memory 403 and coordination of data received and/or transmitted via RF interface 404. Controller 401 may also receive and process signals from tamper sensor 402. Controller 401 may be, for instance, a processor such as a microprocessor, or another type of circuitry that is commonly used for RFID tag control.

Memory 403 may store any type of data desired, including the identifier discussed previously and data that depends upon signal generated by tamper sensor 402. Tamper sensor 402 may generate these signals based upon sensing an environmental characteristic, such as sensing whether monetary package 307 is in an opened or closed state. For example, tamper sensor 402 may generate a signal (digital data or an analog signal) responsive to monetary package 307 being in an open state, or tamper sensor 402 may generate the signal responsive to monetary package 307 being in a closed state. Alternatively, signal may be generated in both states, except that a value of the signal may depend upon the open/closed state of monetary package 307.

As an alternative to generating an actual signal, tamper sensor 402 may modulate a signal generated by RFID tag 309 (e.g., by controller 401). For example, as will be discussed in further detail, tamper sensor 402 may be considered an electrical load that changes resistance depending upon the open/closed stated of monetary package 307.

In operation, when controller 401 or memory 403 (depending upon whether the embodiment of FIG. 4 or FIG. 5 is being discussed) receives an indication from or via tamper sensor 402 that monetary package 307 is in an open state, then data indicating the existence of the open state may be stored in memory 403. This data may be, for instance, a single bit, the value of which indicates whether there has been an open state. The data may be stored directly into memory 403 from tamper sensor 402 (and indeed in such an embodiment, tamper sensor 402 may be integrated with memory 403), or may be stored by controller 401.

Also, after an open state has been detected and an indication thereof has been stored in memory 403, the indication may not be changed responsive to a subsequent closed state being detected. Thus, the stored indication may be an indication of whether an open state has ever occurred during a time period. However, because monetary package 307 may be legitimately in an open state before use (e.g., before filling monetary package 307 with cash and then closing monetary package 307 for transport along the cash supply chain), memory 403 may be configured to be resettable in response to an external input. The resetting of memory 403 may cause the indication of the open/closed state to be set to indicate that an open state has not yet occurred. The external input may be in the form of, for instance, an electrical signal being applied to a hard-wired input of RFID tag 309 and/or an appropriate command via an RF signal wirelessly received at RF interface 404. The input may further indicate a particular identifier to be stored in memory 403, if an identifier is not already assigned or if the identifier is desired to be changed. A security feature may also be used in that the reset function may not be performed unless the input contains a particular set of data such as a password.

Figure 6:
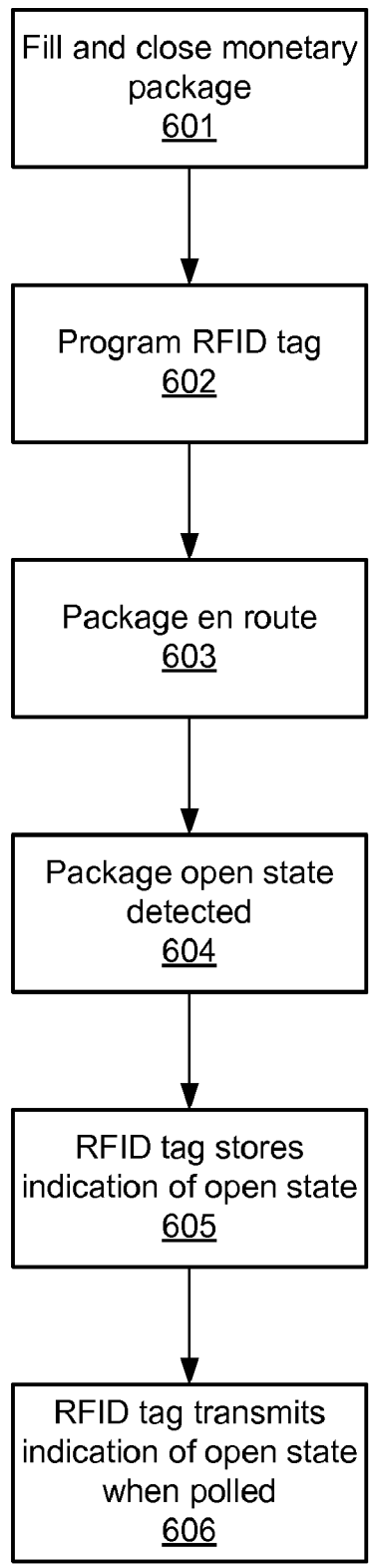
FIG. 6 is a flow chart of illustrative steps that may be performed using a monetary package having tamper-detecting capabilities.

FIG. 6 shows an overview of how RFID tag 309 and tamper sensor 402 may be typically used in relation to monetary package 307 in the cash supply chain. In step 601, monetary package 307 is filled with the desired amount of monetary items 308, and then monetary package 307 is closed. In step 602, RFID tag 309 is programmed. This programming may include resetting RFID tag 309 as described previously, such as by setting the open state indication to indicate a closed state in memory 403, and/or to set the identifier stored in memory 403.

In step 603, monetary package 307 is sent en route to another destination in the cash supply chain. In this example, it will be assumed that monetary package 307 is opened at some point along the cash supply chain. Thus, in step 604 this open state is detected by tamper sensor 402, and in step 605 RFID tag 309 stored the indication of the open state in memory 403.

In further embodiments, global positioning system (GPS) technology may be utilized to help detect tampering in real time or near real time. Responsive to tampering being detected, the monetary package may be configured to destroy the contents of the monetary package (e.g., by activating a dye pack) and/or sending an alert message (e.g., wirelessly via a transmitter that is part of the monetary package, such as RF interface 404) to an appropriate party to indicate that tampering has occurred. In addition, a decision may be made as to whether only one monetary package or multiple related monetary packages had been tampered with (based upon the alert messages sent by the monetary packages). If, for example, it is determined that greater than X number of monetary packages (where X is a whole number) were tampered with, the outcome may be different. For example, depending upon how many monetary packages are detected as being tamper with, it may be decided to provide an alert message, to release a dye pack, to turn on a video camera, and/or to lock down an area. These decisions may be made, for instance, by the bank in response to the alert messages sent by the monetary packages.

Returning to FIG. 6, monetary package 307 then continues through the cash supply chain until at some point RFID tag 309 is polled by RFID scanner 306. In response to the polling, in step 606 RFID tag 309 transmits the stored identifier and/or the stored open state indication. In response, scanner 306 may detect the transmitted identifier and open state indication, and further indicate the status of the open state indication to the user of scanner 306.

In some embodiments, the open state indication and the identifier may be one and the same. For example, while in some embodiments the open state indication may be a separate bit, in other embodiment, the open state indication may be a bit within the identifier or may be embodied as some other modification to the value of the identifier. For instance, a first range of identifier values may indicate that monetary package 307 has not been opened, whereas a second range of identifier value may indicate that monetary package 307 has been opened. As an example of such a range-based embodiment, where the identifier is a string of bits, the most significant bit of the identifier may be used as the open state identifier. This may be useful where existing RFID scanners are used that are not able to receive data separate from a standard identifier. In such a case, the value of the identifier itself may be used to determine whether monetary package 307 has been opened.

Figure 7:
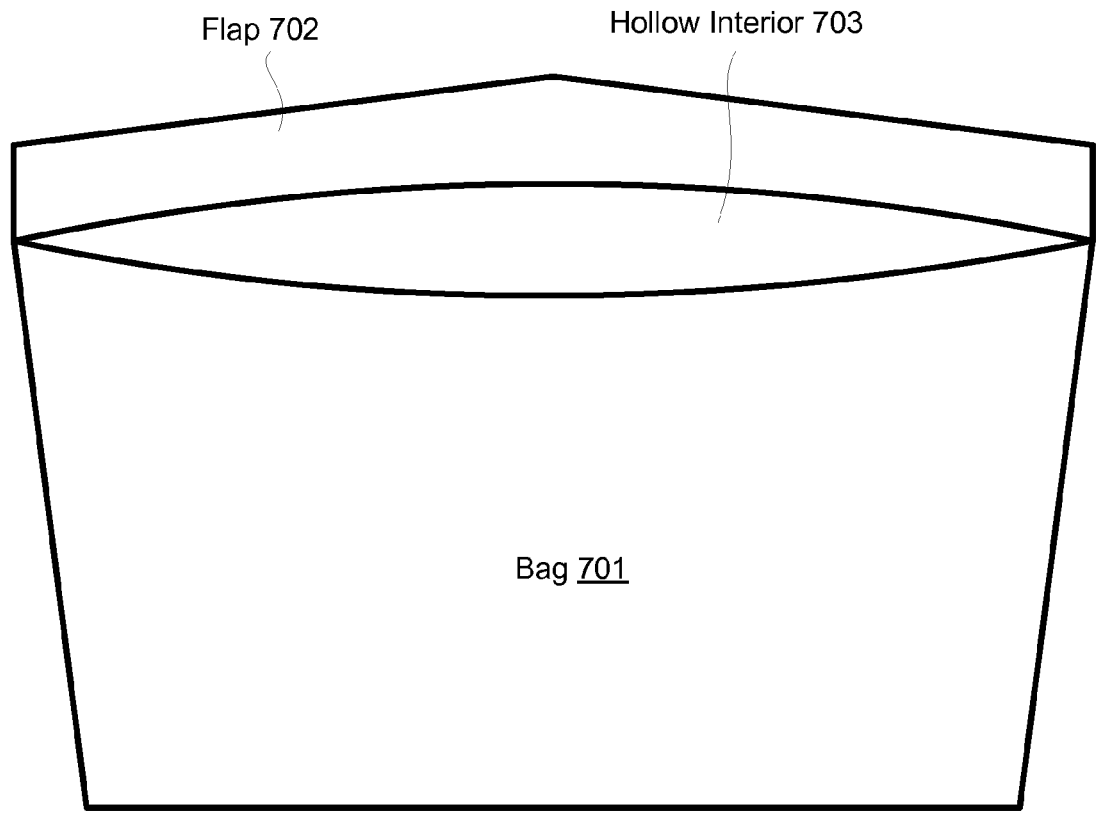
FIG. 7 shows a monetary package embodied as an illustrative bag for holding monetary items.

Monetary package 307 may be considered in an "open" state depending upon the configuration of monetary package 307 and the configuration of tamper sensor 402. For example, referring to FIG. 7, monetary package 307 is embodied as an illustrative bag 701 configured as a container having a hollow interior 703 for holding monetary items 308, such as cash, checks, etc., and a flap 702 for opening and closing hollow interior 703. Bag 701 may be made of a flexible material such as plastic and/or a fiber weave such as those strong weaves used in conventional shipping envelopes. In this example, bag 701 may be considered in an open state when flap 702 is open and in a closed state when flap 702 is closed, or sealed, against the main body of bag 701. Thus, tamper sensor 402 may be configured to detect the open/closed position of flap 702. Bag 701 may also be considered in an open state if any portion of bag 701 is breached (e.g., torn or cut), even at a location other than flap 702. Thus, tamper sensor 402 may additionally or alternatively be configured to detect such a breach.

Figure 8:
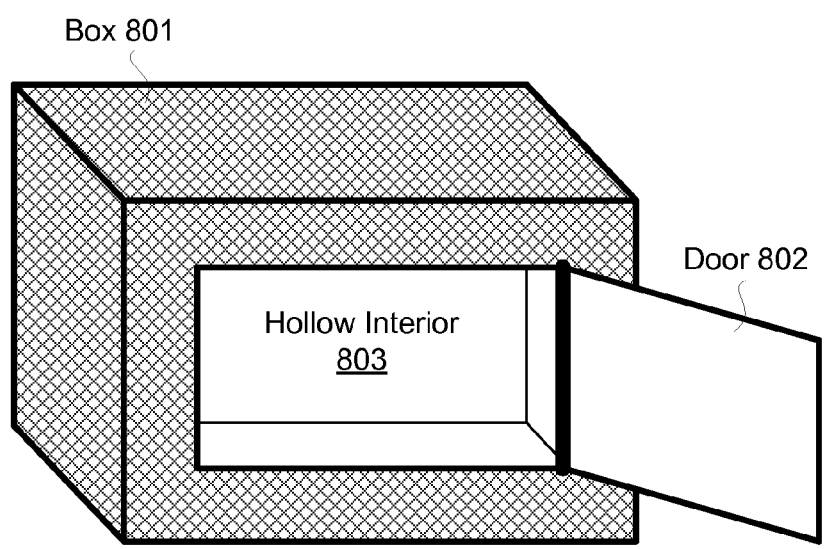
FIG. 8 shows a monetary package embodied as an illustrative box for holding monetary items.

FIG. 8 shows yet another example of monetary package 307, this time embodied as a box 801. Box 801 may be made of a relatively inflexible material such as hard plastic or metal. In this example, box 801 is somewhat configured like a safe, in that box 801 defines a hollow interior 803 for holding monetary items 308 and a door 802 configured to open and close, thereby sealing off hollow interior 803. In this example, box 801 may be considered in an open state when door 802 is open and in a closed state when door 802 is closed, or sealed, against the main body of box 801. Thus, tamper sensor 402 may be configured to detect the open/closed position of door 802. Box 801 may also be considered in an open state if any portion of box 801 is breached (e.g., cut, melted, drilled, or smashed), even at a location other than door 802. Thus, tamper sensor 402 may additionally or alternatively be configured to detect such a breach.

Figure 9:
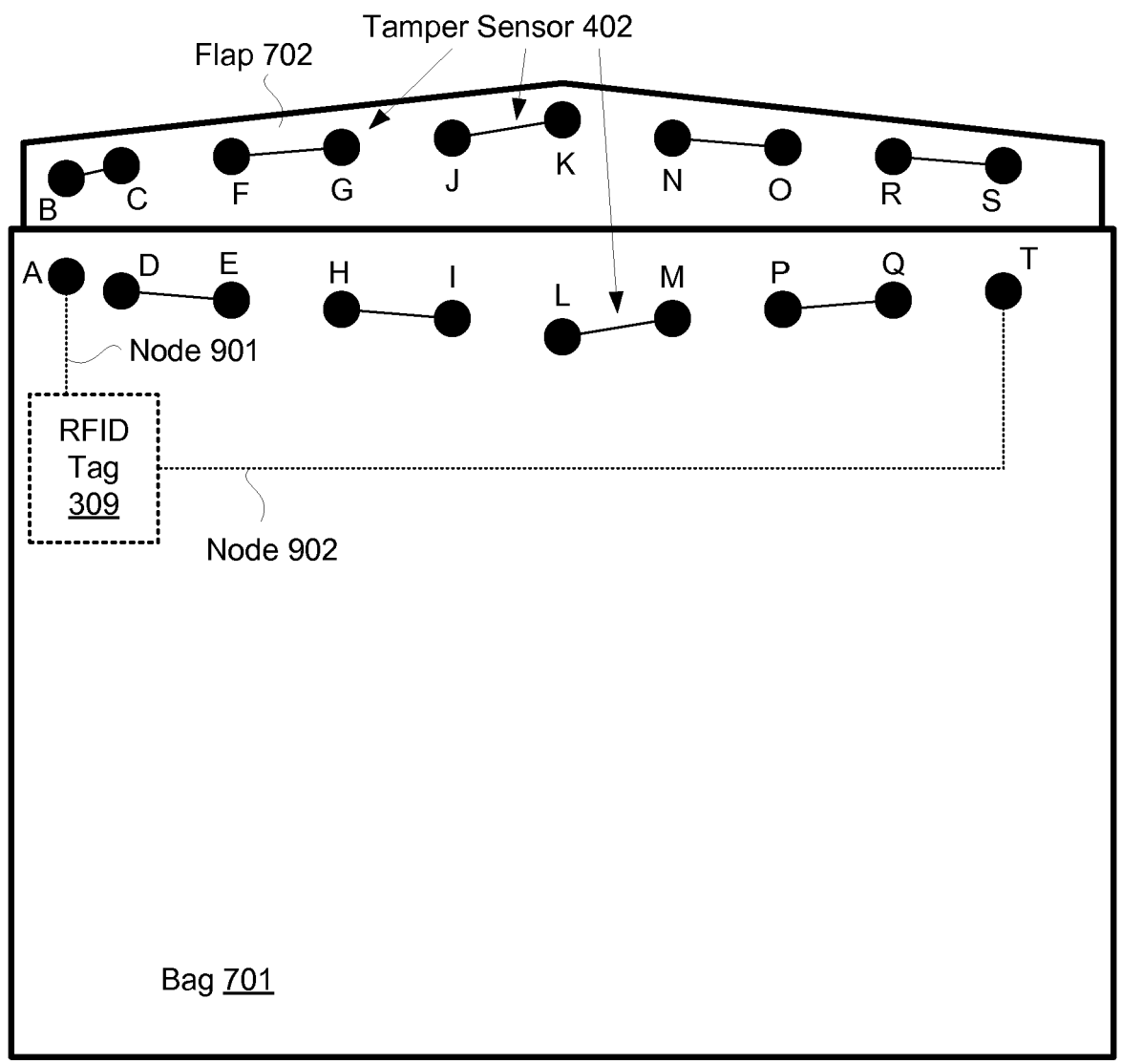
FIG. 9 shows an illustrative bag with a flap in the open position, the flap having a tamper sensor.

Various examples of how tamper sensor 402 may be configured will now be described. Referring to FIG. 9, tamper sensor 402 is embodied as an electrically conductive path disposed on at least flap 702 of bag 701, and in this case also on a main body of bag 307. In this case, the electrically conductive path includes a plurality of electrically conductive exposed contacts arranged in electrical series with each other (labeled A through T), some of which are located on flap 702 and others of which are located on the main body of bag 307. For instance, contacts B, C, F, G, J, K, N, O, R, and S are located on an inner surface of flap 702 (the inner surface of flap 702 being the surface that faces the main body of bag 307 when flap 702 is in a closed position), and contacts A, D, E, H, I, L, M, P, Q, and T are located on an outer surface of the main body of bag 307 (the outer surface of the main body being the surface that faces the inner surface of flap 702 when flap 702 is in a closed position). The electrically conductive path extends between two electrical nodes 901 and 902, which are coupled to inputs and/or outputs of RFID tag 309. These nodes 901 and 902 may be considered the connections between tamper sensor 402 and either controller 401 or memory 403 in FIGS. 4 and 5. In FIG. 9, flap 702 is shown in an open position. In this open position, there is not a continuous electrical path from node 901 to node 902.

Figure 10:
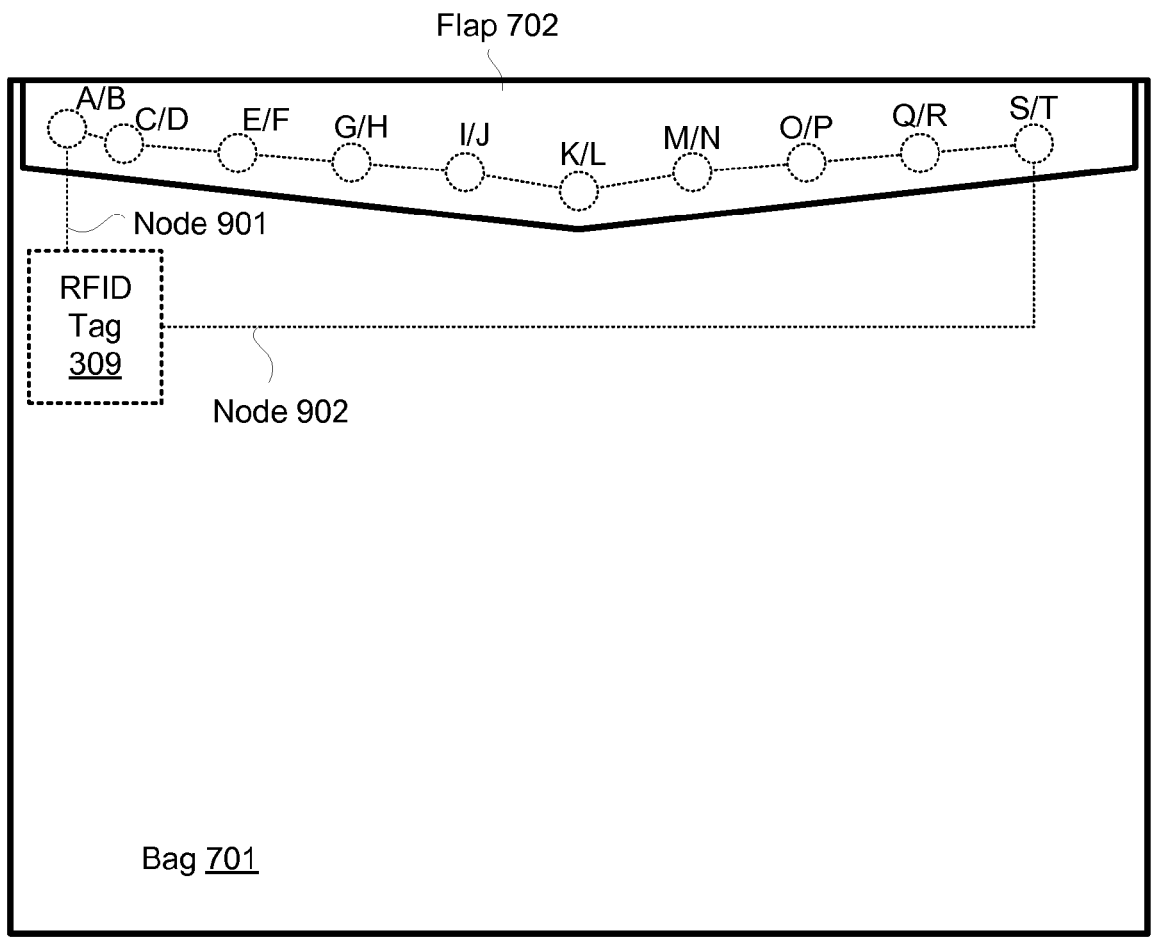
FIG. 10 shows the bag of FIG. 9 with the flap in the closed position.

FIG. 10 shows the same embodiment as FIG. 9, except that now flap 702 is in a closed position. As can be seen, contacts A-T are arranged so as to electrically mate with each other in pairs in such a manner that completes the electrical circuit between nodes 901 and 902. In this example, contact A mates with contact B, contact C mates with contact D, contact E mates with contact F, contact G mates with contact H, contact I mates with contact J, contact K mates with contact L, contact M mates with contact N, contact O mates with contact P, contact Q mates with contact R, and contact S mates with contact T. When all of the pairs are mated as shown, a continuous electrical path exists between nodes 901 and 902— i.e., a close circuit. Thus, the resistance of this path between nodes 901 and 902 may be relatively low. However, when even a single pair of contacts do not electrically mate, then the path between nodes 901 and 902 is broken—i.e., an open circuit. Thus, the resistance of the path between nodes 901 and 902 may be relatively high. RFID tag 309 may be configured to detect the open circuit versus close circuit, e.g., by detecting the impedance difference. Thus, the open state indication in memory 403 may be set to a value responsive to this open/closed circuit detection, in a manner as described previously.

Contacts A-T, and the conductive lines connecting them, may be made of any conductive material such as metal or conductive ink, and may be applied to respective surfaces of bag 701 and/or embedded therein.

Figure 11:
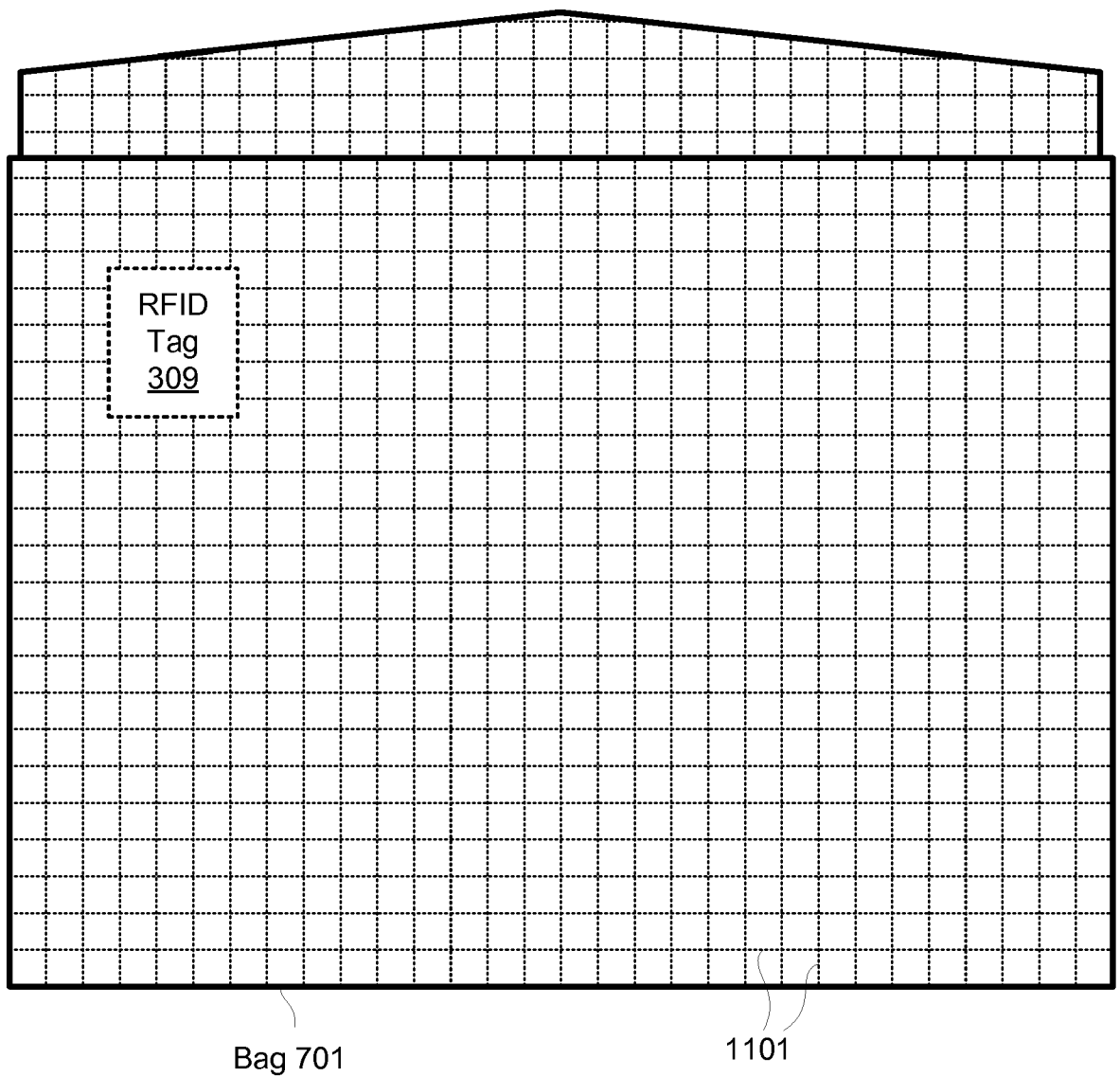
FIG. 11 shows another illustrative bag with a tamper sensor distributed throughout the bag.

Another example of tamper sensor 402 is shown in FIG. 11. In this example, tamper sensor 402 may include a plurality of electrically conductive lines 1101 that may be disposed at intervals over a portion of bag 701, or even over the entirety of bag 701 such as shown in FIG. 11. Conductive lines 1101 may be formed, for instance, in a grid pattern or any other pattern that is effective to cover large areas of the surface of bag 701 without leaving uncovered large regions between conductive lines 1101.

The various conductive lines may be coupled in series or in parallel relative to each other.

For instance, each conductive line 1101 may individually form an electrical loop having nodes coupled to RFID tag 309. Or, conductive lines 1101 may be coupled in series with each other and thus form a single long loop having nodes coupled to RFID tag 309. In a similar manner as discussed previously with regard to FIGS. 9 and 10, RFID tag 309 may sense the impedance change in one or more of conductive lines 1101 upon the breaking of any one or more of conductive lines 1101. Such breaking may be expected to occur if bag is cut, torn, or pierced to produce an opening sufficient to remove the cash contents therein. Conductive lines 1101 may be applied to the outer and/or inner surfaces of bag 701, and/or may be woven into the material itself of bag 701. For instance, conductive lines 1101 may be made of a metallic string and/or printed as ink on an inner and/or outer surface of bag 701.

Figure 12:
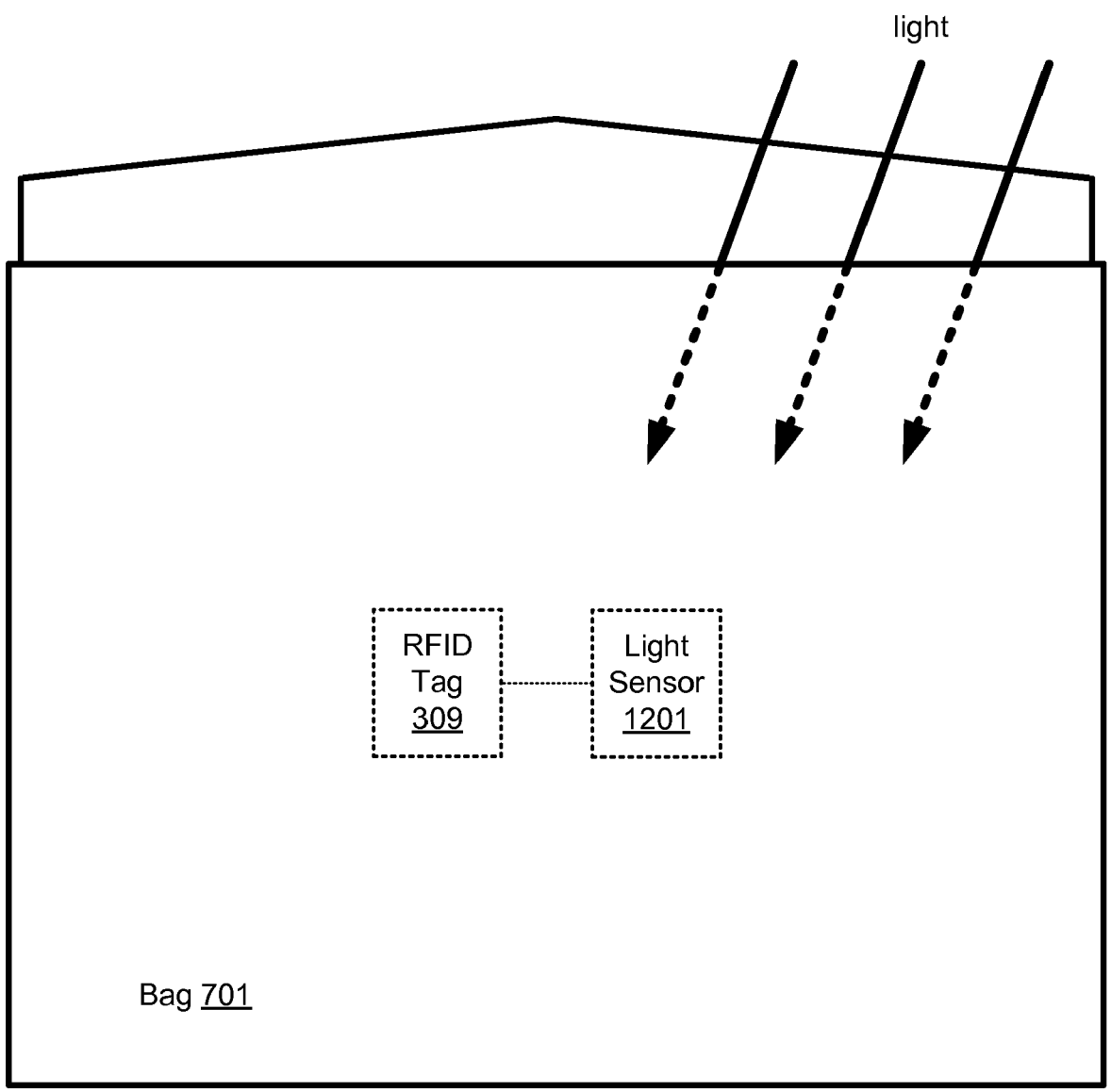
FIG. 12 shows yet another illustrative bag with a light-sensing tamper-indicating device.

FIG. 12 shows yet another embodiment in which tamper sensor 402 is embodied as a light sensor 1201 that is configured to detect the presence of light. In this example, at least a sensing portion of light sensor 1201 may be contained within hollow interior 703 of bag 701. When hollow interior 703 is properly closed, then it is expected that either a reduced amount of light or no light at all will be received by light sensor 1201. When hollow interior 703 is breached, such as by opening flag 702 and/or by other means, then it is expected that light sensor 1201 will receive light originating from outside bag 701. Thus, the open/closed state of bag 701 in this embodiment may be correlated to whether light is being sensed, or to the amount of light sensed, by light sensor 1201. In such an embodiment, it may be desirable to make bag 701 from a material that blocks or substantially blocks light.

Thus, a variety of illustrative embodiments of a monetary packages have been described that are capable of detecting tampering and of communicating such tampering to an entity separate from the monetary package. Although many of the examples have been directed to monetary packages in the form of bags, it should be understood that the various embodiments may also be applied to other types of monetary packages, such as a box as in the example of FIG. 5. For instance, the descriptions of various bag embodiments may be applied where flap 702 is replaced with door 802.

The invention claimed is:

1. A monetary package, comprising:
   a bag having a volume configured to hold monetary items, the bag having a body and a flap moveable with respect to the body;
   a sensor configured to detect an opening of the container, the sensor comprising a first plurality of electrically conductive contacts disposed on the outer surface of the body and a second plurality of electrically conductive contacts disposed on the surface of the flap, the first and second plurality of contacts being arranged such that when the flap is in the closed position, each of the first plurality of contacts mates with one of the second plurality of contacts, thereby forming a common electrical path extending continuously through the first and second plurality of contacts when the flap is in the closed position;
   a device coupled to the sensor and configured to store data responsive to the sensor detecting an opening of the bag; and
   a transmitter configured to wirelessly send the stored data.

2. The monetary package of claim 1, further comprising a receiver configured to wirelessly receive a signal, wherein the transmitter is configured to wirelessly transmit the data responsive to the signal.

3. The monetary package of claim 1, further comprising a receiver configured to wirelessly receive a signal, wherein the transmitter is configured to be powered by the received signal.

4. The monetary package of claim 1, wherein the flap comprises a first plurality of conductive lines, the first plurality of contacts comprises a plurality of pairs of the contacts, and each of the pairs of the first plurality of contacts is electrically coupled together through one of the first plurality of conductive lines.

5. The monetary package of claim 4, wherein the body comprises a second plurality of conductive lines, the second plurality of contacts comprises a plurality of pairs of the contacts, and each of the pairs of the second plurality of contacts is electrically coupled together through one of the second plurality of conductive lines.

6. The monetary package of claim 5, wherein when the flap is in the closed position, all of the first and second pluralities of conductive lines are electrically coupled together to form the electrical path.

7. The monetary package of claim 5, wherein the first and second pluralities of conductive lines comprise lines that are woven into a material of the flap and the body of the bag.

8. The monetary package of claim 1, wherein the first and second pluralities of contacts comprise conductive ink.

9. The monetary package of claim 1, wherein the sensor further comprises a grid of conductive lines that are part of the electrical path when the flap is in the closed position.

10. The monetary package of claim 1, further comprising a dye pack, wherein the monetary package is configured to activate the dye pack responsive to the sensor detecting the opening of the bag.

11. A monetary package, comprising:
    a bag having a body and a flap moveable with respect to the body, wherein the flap has a surface that, when in a closed position, faces an outer surface of the body;
    a sensor configured to detect an opening of the flap, the sensor comprising a first plurality of electrically conductive contacts disposed on the outer surface of the body and a second plurality of electrically conductive contacts disposed on the surface of the flap, the first and second plurality of contacts being arranged such that when the flap is in the closed position, each of the first plurality of contacts mates with one of the second plurality of contacts, thereby forming a common electrical path extending continuously through the first and second plurality of contacts when the flap is in the closed position;
    a radio-frequency identifier (RFID) tag configured to store an identifier and data having a value that depends on whether the sensor has detected that the flap has been opened, and to wirelessly transmit the identifier and the data.

12. The monetary package of claim 11, wherein the flap comprises a first plurality of conductive lines, the first plurality of contacts comprises a plurality of pairs of the contacts, and each of the pairs of the first plurality of contacts is electrically coupled together through one of the first plurality of conductive lines.

13. The monetary package of claim 12, wherein the body comprises a second plurality of conductive lines, the second plurality of contacts comprises a plurality of pairs of the contacts, and each of the pairs of the second plurality of contacts is electrically coupled together through one of the second plurality of conductive lines.

14. The monetary package of claim 11, further comprising a dye pack, wherein the monetary package is configured to activate the dye pack responsive to the sensor detecting the opening of the container.

15. A tamper-detecting device for a monetary package, the tamper-detecting device comprising:
    a bag comprising a body and a flap moveable with respect to the body;
    a sensor configured to detect an opening of the monetary package, the sensor comprising a first plurality of electrically conductive contacts disposed on the outer surface of the body and a second plurality of electrically conductive contacts disposed on the surface of the flap, the first and second plurality of contacts being arranged such that when the flap is in the closed position, each of the first plurality of contacts mates with one of the second plurality of contacts, thereby forming a common electrical path extending continuously through the first and second plurality of contacts when the flap is in the closed position; and a device coupled to the sensor and configured to store data responsive to the sensor detecting an opening of the bag.

16. The tamper-detecting device of claim 15, further comprising a receiver configured to wirelessly receive a signal, wherein the transmitter is configured to wirelessly transmit the data responsive to the signal.

17. The tamper-detecting device of claim 15, further comprising a receiver configured to wirelessly receive a signal, wherein the transmitter is configured to be powered by the received signal.

18. The tamper-detecting device of claim 15, wherein the flap comprises a first plurality of conductive lines, the first plurality of contacts comprises a plurality of pairs of the contacts, and each of the pairs of the first plurality of contacts is electrically coupled together through one of the first plurality of conductive lines.

19. The tamper-detecting device of claim 18, wherein the body comprises a second plurality of conductive lines, the second plurality of contacts comprises a plurality of pairs of the contacts, and each of the pairs of the second plurality of contacts is electrically coupled together through one of the second plurality of conductive lines.

20. The monetary package of claim 15, further comprising a dye pack, wherein the monetary package is configured to activate the dye pack responsive to the sensor detecting the opening of the container.

* * * * *